(12) United States Patent
Ito et al.

(10) Patent No.: US 7,101,588 B2
(45) Date of Patent: *Sep. 5, 2006

(54) APPARATUS AND METHOD FOR APPLYING LIQUID MATERIAL TO FORM A RESIN LAYER

(75) Inventors: Eiichi Ito, Nishinomiya (JP); Kazuya Hisada, Osaka (JP); Kazuhiro Hayashi, Kadoma (JP); Shinya Abe, Kadoma (JP); Eiji Ohno, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/327,129

(22) Filed: Dec. 24, 2002

(65) Prior Publication Data

US 2003/0124249 A1  Jul. 3, 2003

(30) Foreign Application Priority Data

Dec. 28, 2001 (JP) .............................. 2001-399934

(51) Int. Cl.
*B05D 3/12* (2006.01)
*B05D 3/06* (2006.01)
*B05D 1/40* (2006.01)
*B05C 11/08* (2006.01)
*C08J 7/04* (2006.01)

(52) U.S. Cl. ..................... 427/240; 427/512; 427/553; 118/52

(58) Field of Classification Search ................ 427/512, 427/508–521, 553, 554, 240
See application file for complete search history.

(56) References Cited

U.S. PATENT DOCUMENTS

| 4,875,434 A | * | 10/1989 | Maejima et al. | 118/52 |
| 5,069,156 A | * | 12/1991 | Suzuki | 118/52 |
| 5,294,257 A | * | 3/1994 | Kelly et al. | 118/52 |
| 6,077,349 A | * | 6/2000 | Kikuchi | 118/52 |
| 6,232,247 B1 | * | 5/2001 | Gordon et al. | 438/780 |
| 6,327,793 B1 | * | 12/2001 | Gurer et al. | 34/317 |
| 6,349,086 B1 | * | 2/2002 | Nishida et al. | 369/280 |

(Continued)

FOREIGN PATENT DOCUMENTS

JP         03-001525    *   1/1991   .................. 118/52

(Continued)

OTHER PUBLICATIONS

JPO machine translation and English absract of JP 2001-307391, pub. Nov. 2, 2001 to Yoshio et al.*

*Primary Examiner*—Marianne Padgett
(74) *Attorney, Agent, or Firm*—Wenderoth, Lind & Ponack, L.L.P.

(57) ABSTRACT

A liquid material is applied by spin coating it onto a first main surface of a flat plate to form a coating of the liquid material thereon. The flat plate includes a second main surface which is opposite to the first main surface and a hole which passes through the flat plate. The application of the liquid material is carried out using an inner guide member, which is placed in the hole, and the spin coating is carried out while the flat plate is placed on a stage such that the inner guide member is placed generally adjacent to an inner peripheral side surface of the flat plate and an upper surface of the inner guide member and the first main surface are located at generally the same level. Thereby, a coating is obtained which extends on the upper surface of the inner guide member and the first main surface of the flat plate.

40 Claims, 9 Drawing Sheets

U.S. PATENT DOCUMENTS

| | | |
|---|---|---|
| 6,527,860 B1 * | 3/2003 | Yoshihara et al. ............. 118/52 |
| 6,706,359 B1 * | 3/2004 | Mino et al. ................. 428/64.1 |
| 6,866,887 B1 * | 3/2005 | Chen et al. ................. 427/240 |
| 2001/0018093 A1 * | 8/2001 | Decre ........................... 427/58 |
| 2001/0052320 A1 * | 12/2001 | Komaki et al. ............. 118/722 |
| 2003/0101929 A1 * | 6/2003 | Yoshihara et al. ............. 118/52 |
| 2004/0180141 A1 * | 9/2004 | Koyayashi et al. ......... 427/240 |
| 2004/0219326 A1 * | 11/2004 | Komaki et al. ............ 428/64.4 |
| 2005/0048202 A1 * | 3/2005 | Komaki et al. ............. 427/240 |

FOREIGN PATENT DOCUMENTS

| | | | |
|---|---|---|---|
| JP | 05-283326 A * | 10/1993 | ................... 118/52 |
| JP | 05-283329 A * | 10/1993 | ................... 118/52 |
| JP | 2001-307391 | 11/2001 | |
| WO | 01/63606 | 8/2001 | |

\* cited by examiner (a)

201

(b)

202

206

(a)

(b)

(a)

(b)

(c)

(a)

(b)

(a)

(b)

APPARATUS AND METHOD FOR APPLYING LIQUID MATERIAL TO FORM A RESIN LAYER

CROSS-REFERENCE OF RELATED APPLICATION

The present application claims priority under 35 U.S.C. § 119 to Japanese Patent Application No. 2001-399934, filed on Dec. 28, 2001, entitled "APPLICATION METHOD AND FORMATION METHOD OF RESIN LAYER". The contents of that application are incorporated herein by reference in their entirety.

BACKGROUND OF THE INVENTION

1. Field of the Invention

The present invention relates to an application method of a liquid material using spin coating, application equipment for such application method, a product which is produced using such application method (for example, an optical disc, a liquid crystal display, a magnetic disk, etc.) and a production process and a production apparatus of such product using such application method.

2. Description of Related Art

The conventional methods of applying a liquid material are shown in FIGS. 8(a) to (d) wherein the liquid material 804 is applied on a substrate 806 using a brush 802 (see FIG. 8 (a)), a liquid material 804 is dropped onto a substrate 806 from a nozzle 808 (see FIG. 8 (b)), a liquid material 804 is sprayed onto a substrate 806 through a nozzle 810 (see FIG. 8 (c)), and a liquid material 804 on a roller 812 is transferred to a substrate 806 (see FIG. 8 (d)).

In order to remove an amount of a liquid material that has been excessively applied on an object, to make a thickness of a coating formed on an object by the application, or to uniformly spread on an object a liquid material which is supplied thereto, a spin coating method is used wherein the object to which the liquid material is to be applied is placed on a turn table (or a stage), which is, in turn, rotated so that a centrifugal force is applied to the liquid material. Generally, the uniform thickness of the coating is obtained by the spin coating method only when the thickness of the coating is small enough. When the thickness of the coating is large, the variation over the applied surface is large after the spin coating. In a case where the thickness of the coating is 10 micrometers or more, the thickness variation of the coating is 20% or more based on an average thickness.

FIGS. 9(a) and (b) show in a sectional view a typical state of the liquid material 903 supplied to a plate 901 supported on a stage 902 just after the liquid material has been applied using the conventional spin coating method. With the conventional spin coating method, a bulged portion 904 of a coating thickness is formed on an outer peripheral part 910 of the plate 901 (i.e., a portion of the plate shown with a bi-directional arrow, see FIG. 9(a)). Moreover, in the case where the liquid material is applied to a plate 901 that has a hole 908 in its central part, a thickness of the coating on a portion 920 of the plate around the hole 908 (i.e., a portion of the plate shown with a bidirectional arrow, see FIG. 9 (b)) becomes thin.

As a product produced using such a spin coating method, there is an optical disc which has been recently used as a mass recording medium. Attempts to increase the capacity and high recording density of the optical disc are on-going now, and specifically, an approach of enlarging a numerical aperture (NA) of an object lens for a record/reproduction device, and an approach of shortening a wavelength of a laser beam to be used are now being studied. In the optical disc, when a thickness of a substrate on a record/reproduction side of the disc, the substrate functioning as a light permeable layer (i.e. a substrate on a side from which a laser beam is injected), is thinner, an effect of aberration on a laser beam spot becomes smaller so that a tolerance of an inclination angle (tilt) of the disc can be increased. Based on this, it is proposed that the thickness of the substrate on the record/reproduction side is about 0.1 mm, NA is about 0.85 and the wavelength of the laser is about 400 nm. With such a proposal, it is desirable that the variation in the thickness of the substrate on the record/reproduction side be suppressed to within 5% considering the effects of a record/reproduction beam on the focus and spherical aberration.

As a method which achieves such suppressed variation in the thickness, it is conceived that sheet form substrates, each having a uniform thickness (of about several tens of micrometers), are laminated with a light curable resin. However, the use of such sheet form substrates is very costly, and thus, it is preferable to form the record/reproduction side substrate by only using the spin coating method.

It is very difficult to apply a liquid material by the conventional spin coating method so as to form a uniform coating having a thickness is not smaller than several tens of micrometers. According to the conventional spin coating method, the liquid material is always forced toward a periphery of the object due to the centrifugal force, so that the thickness of the coating formed by the application is thinner toward an inner peripheral part of the object and thicker toward an outer peripheral part of the object. Moreover, the thickness of the coating of the outer peripheral part becomes extremely thick because of the surface tension of the liquid material.

SUMMARY OF THE INVENTION

Therefore, it is an object of the present invention to provide a method which, upon the formation of a coating on an object by the spin coating method, makes it possible to form the coating with a more uniform thickness.

A first application method (or coating formation method) according to the present invention which achieves the above object resides in a liquid material application method wherein a liquid material is supplied onto a first main surface of a flat plate which comprises the first main surface and a second main surface which are opposed to each other, and applied onto the first main surface to form a coating thereon by the spin coating (or the spin coating method). The first application method is characterized in that the spin coating is carried out while an outer guide member is placed generally adjacent to an outer peripheral side surface of the flat plate so that an upper surface of the outer guide member and the first main surface are located at generally the same level. In this method, the outer guide member is placed generally adjacently to the outer peripheral side surface of the flat plate (i.e., a surface which connects the first and second main surfaces of the flat plate and which extends along a thickness direction of the flat plate) and the first main surface of the flat plate and the upper surface of the guide member are included by substantially the same planar surface from a geometry viewpoint. It is noted that the term "level" as to a surface means a distance from a certain basic point at a height of zero to the particular surface (in the above case, the first main surface of the flat plate or the upper surface of the guide member), and thus a height of the particular surface.

In the present specification, when referred to that one surface and another surface are "located at generally the same level", those two surfaces are located in a condition at the same level or in a condition which is close to the same level condition (namely, those two surfaces are at almost the same level). Concretely, even though there is actually a level difference between the two surfaces, they satisfy the "located at generally the same level" condition as far as the uniformity of the coating formed by the application method according to the present invention is improved compared with the conventional application method without using a guide member when the feature of "being located at generally the same level" is combined with a below explained feature that the guide member(s) is placed "generally adjacently" to the outer peripheral side surface and/or an inner peripheral side surface of the flat plate. It is noted that the feature of "located at generally the same level" will be explained more concretely below.

By the application method according to the present invention, the bulge portion in the thickness of the coating is formed on the upper surface of the outer guide member, so that the coating can have a uniform thickness even on the outer peripheral part of the flat plate.

The flat plate in the present specification is a sheet form member (therefore, its thickness dimension is considerably smaller when compared with dimensions the main surfaces) which comprises the first and second main surfaces which are flat and opposed to each other. The shape of the main surfaces may be a circle (or an annularity when the surface includes a hole in its central part), a rectangle, a square, a polygon (including a regular polygon) or other form. The main surfaces preferably have a shape of point symmetry and/or axial symmetry. A preferable flat plate is a circular substrate called a disc or a rectangular substrate (including a square substrate) called a card.

Rotation carried out upon the spin coating is performed by rotating the flat plate around an axis which passes the first main surface at any point and preferably a center point of the first main surface perpendicularly to such surface. The center point herein may be a geometrical center of gravity or it may be a symmetrical center when the shape of the first main surface is of the point symmetrical. For example, when the flat plate is a circular disc, the center of the circle as the first main surface corresponds to the center point, and when the flat plate is a rectangular sheet (including a square substrate), the intersection of the diagonal lines of the rectangle as the first main surface corresponds to the center point.

In one embodiment, the flat plate may have a hole in its center which passes through the plate. Similarly to the main surface of the flat plate, the shape of the hole may be a circle, a rectangle or any other form, and it is preferable that a center point of the hole corresponds to the center point of the flat plate. It is noted that the meaning of the center point of the hole is the same as that with respect to the flat plate as described before. Upon applying the liquid material onto the flat plate having the thus described hole, the embodiment is characterized in that an inner guide member is placed generally adjacently to an inner peripheral side surface (which defines the hole) and the spin coating is carried out while an upper surface of the inner guide member is located at generally the same level as that of the first main surface of the flat plate.

Thus, a second application method according to the present invention which achieves the above object is characterized in that when the liquid material is applied to the first main surface of the flat plate having the hole by the spin coating, the inner guide member is so placed in the hole of the flat plate that it is generally adjacent to the inner peripheral side surface which defines the hole of the flat plate and also that an upper surface of the inner guide member is at generally the same level as that of the first main surface of the flat plate, and then the liquid material is supplied followed by rotating the flat plate. With such application method according to the present invention, a coating of which thickness on an inner peripheral part of the flat plate is uniform can be obtained. It is noted that in the second application method, the outer guide member may be further provided which is generally adjacent to the outer peripheral side surface of the flat plate.

It is noted that in the above-described application methods, the liquid material may be supplied to the first main surface or the upper surface of the inner guide member if it is present. For example, the liquid material can be supplied through a nozzle. When supplying onto the first main surface of the flat plate, it is preferable that the liquid material is supplied onto the surface side as radially inside as possible so as to have a large effective coated area.

In the first and second application methods according to the present invention, the outer guide member and the inner guide member are placed generally adjacently to the outer peripheral side surface and the inner peripheral side surface of the flat plate, respectively. This means that the outer guide member is present around the whole of the outer peripheral side surface of the flat plate, and that the inner peripheral side surface of the flat plate is present around the whole of the inner guide member. For example, the upper surface of the outer guide member may be a ring form having a certain width and the upper surface of the inner guide member may be a flat ring form having a certain width or it may be a disc. For example, the outer guide member may be a member having an opening which is complementary to the outer peripheral side surface (therefore, which surrounds the first main surface) of the flat plate. When the flat plate is a disc, the outer guide member may be, for example, an annular form member which just tightly surrounds the disc in its opening. For example, then the inner guide member may be a member having an outer profile which corresponds to the inner peripheral side surface (therefore, the inner peripheral part of the first main surface) of the flat plate. When the flat plate has a circular hole, the inner guide member may be, for example, a circular or annular form member.

Throughout the present specification, the term "guide member" is intended to mean any member which has an upper surface on or over which the liquid material flows and from which to the first main surface of the flat plate (in the case of the inner guide member) and to which from the first main surface of the flat plate (in the case of the outer guide member) the liquid material smoothly flows across the border between the surfaces. In this sense, the guide member can be said to guide the liquid material so as to allow such smooth flow. The upper surface of the guide member is not particularly limited as far as the upper surface can be placed generally adjacently to the flat plate and the upper plate can be at generally the same level as that of the first main surface so that such smooth flow is substantially ensured. For example, the upper surface may have a flat plane portion which is generally adjacent to the flat plate, and the upper surface is preferably an entirely flat plane.

Upon the spin coating, the guide member(s) is preferably rotated around the same rotation center, along the same rotation direction and at the same angular velocity as those of the flat plate, if possible. For example, when the flat plate is a disc which is rotated around its center, the outer guide member in the annular form which is generally adjacent to the outer peripheral side surface of the flat plate may be rotated similarly to the flat plate. Also, when the flat plate has a circular hole coaxially in its center, the inner guide member in the annular or circular form, which member is generally adjacent to the inner peripheral side surface of the flat plate, may be rotated similarly to the flat plate. By rotating the guide members as described above, there occurs no relative movement between the upper surfaces of the guide members and the first main surface of the flat plate, so that the effects provided by the first or second application method are increased. In another embodiment, upon the rotation of the guide members as described above, the angular velocity thereof may not be the same as that of the flat plate and in a further embodiment, the rotation direction of the guide member(s) may be opposite to that of the flat plate.

In any of the above described first and second application methods according to the present invention, the guide member(s) is generally adjacent to the flat plate (or side surface of the flat plate). In the present specification, "being generally adjacent(ly)" means that the side surface of the flat plate and a surface of the guide member which surface is opposed to the side surface are in a contact condition or there may be a gap between the side surface and the surface of the guide member (namely, these two surfaces are opposed through the gap) as far as the effects of the present invention are provided as described below. By being thus generally adjacent, an edge of the upper surface of the guide member is in contact with an edge of the first main surface of the flat plate or it is present away from the edge the first main surface of the flat plate by a little distance as described above.

The former embodiment (i.e., the embodiment wherein the surfaces are in contact) may be applied to the case in which the guide member(s) and the flat plate are rotated around the same rotation center along the same rotation direction and at the same angular velocity (i.e., the case in which the guide member(s) is seen to be stationary when viewed from the rotating flat plate). The latter embodiment (i.e., the embodiment wherein the surfaces are separated by some distance) may be applied to the case in which the guide member(S) is seen to rotate around the flat plate (or to move around the flat plate) when viewed from the rotating flat plate. It is noted that even though the guide member(s) is seen to be stationary when viewed from the rotating flat plate, the latter embodiment may be applicable.

In the generally adjacent condition as described above, it is particularly preferable that with respect to contact between the flat plate and the guide member or a gap between the flat plate and the guide member, a portion of the guide member which portion is in contact with or opposed, through the gap, to the side surface of the flat plate is substantially of a line form. That is, it is particularly preferable that the side surface of the flat plate and the guide member are in line-contact or in line-adjacency. This means that in the contact embodiment, a line form portion (or elongate surface) of the guide member is in contact with the side surface of the flat plate, and in the being opposed embodiment by the gap, the line form portion of the guide member is opposed to the side surface of the flat plate through the gap (i.e., adjacent to the side surface). In the embodiment in which the side surface of the flat plate is generally adjacent to the guide member in the line-contact or line-adjacency as described above, when the flat plate on which a coating has been formed is removed after the spin coating and then a new flat plate is so placed that it is generally adjacent to the guide member, it is prevented or very unlikely that a liquid material which has been left on the guide means deposits onto a side surface of the new flat plate.

Upon the spin coating in the application method according to the present invention as described above, the flat plate is placed on a stage which can be rotated so that the second main surface of the flat plate is supported by the stage while it is in contact with the stage. Upon being supported, an outer peripheral part of the second main surface of the flat plate is preferably located radially outside an outer peripheral part of the stage. In such case, when the flat plate is placed on the stage, the outer peripheral part of the flat plate does not contact with the stage. With this embodiment, when the flat plate is removed away on which a coating has been formed after the spin coating, it is prevented that the liquid material which has been left on the outer guide member flows down onto and deposits on the outer peripheral part of the stage.

In addition, when the flat plate has the hole in its center, it is preferable that the inner peripheral part of the flat plate is located radially inside an inner peripheral part of the stage. Therefore, in the application method according to the present invention, when the flat plate is placed on the stage, the inner peripheral part of the flat plate does not contact with the stage. With this method, when the flat plate on which a coating has been formed is removed after the spin coating, it is prevented that the liquid material which has been left on the inner guide member flows down onto and deposits on the inner peripheral part of the stage.

In the application method according to the present invention, after applying the liquid material by any of the above-mentioned various embodiments, the guide member(s) is moved away from the flat plate and then the flat plate to which the liquid material has been applied is moved away to another place (that is, the flat plate is removed from the stage). When the guide member is moved away from the flat plate beforehand, it is prevented that the liquid material which remains on the guide member deposits onto a side surface of the flat plate which will be applied to next. In addition, irrespective of the structure of the stage, it is prevented that the liquid material which has been left on the inner guide member flows down onto and deposits on the inner peripheral part of the stage when the flat plate is removed away after the application. Also, it is prevented that the liquid material which has been left on the outer guide member flows down onto and deposits on the outer peripheral part of the stage when the flat plate is removed away after the application. This prevents the liquid material which is depositing onto the stage from unnecessary depositing onto the second main surface of a next new flat plate.

The application method according to the present invention as described above is useful when various liquid materials are applied to the flat plate. Optionally, the liquid material may includes any a solid material having various forms (such as powder, filler, particle or any other form) as far as the liquid material behaves as a fluid. Such liquid material includes liquid state resin compositions which are used for the formation of a protection layer, a light permeable layer and the like of an optical disc (such as light curable (for example, UV curable) resin composition). Further, the flat plate to which the application method according to the present invention is applicable includes a sheet or plate-like member having various forms which include a circular substrate or other shaped (for example, a rectangle, a polygon and so on) substrate used for the optical disc. The substrate may have a hole (for example, of a circular shape or other shape) in its central part. Therefore, the application method of this invention is preferably applicable to a method which forms a resin layer on the flat plate.

In other words, the present invention provides the method which forms the resin layer on the flat plate comprising the first and second main surfaces which are opposed to each other, which method comprising:

(1) applying a light curable resin composition onto the first main surface, and (2) then exposing the light curable resin so as to cure the light curable resin composition whereby the resin layer is formed, wherein applying the light curable resin composition is carried out by the application method of the liquid material according to the present invention as described above in which the side surface of the flat plate is generally adjacent to the guide member (namely, the outer guide member and/or the inner guide member), and the spin coating of the light curable resin composition is carried out while the flat plate is so placed on the stage that the upper surface of the guide member is placed at generally the same level as that of the first main surface of the flat plate, so that a coating of the light curable resin composition is formed which extends over the upper surface of the guide member and also the first surface of the flat plate.

It is noted that curing of the light curable resin composition by the exposure is preferably carried out by either (a) removing the flat plate from the stage and exposing the flat plate so as to cure a coating portion only on the first main surface or (b) curing the coating on the first main surface of the flat plate and the upper surface of the guide member(s) while the guide member is generally adjacent to the side surface of the flat plate.

Such a method which forms the resin layer comprises: applying the light curable resin composition as the liquid material to the flat plate using any one of the above described methods according to the present invention so as to obtain the flat plate on which the light curable resin composition is applied while it is uncured; and then curing the light curable composition applied onto the flat plate (for example, curing by irradiating an ultraviolet beam) so as to form the resin layer. With the method of forming the resin layer according to the present invention, the resin layer can be obtained at a lower overall cost and having a small variation in its thickness while it is easy to recover and re-use an uncured resin composition.

In addition, the present invention provides an application apparatus which is used in the application method according to the present invention, and such apparatus comprises the outer guide member and/or the inner guide member as described above. Also, the present invention provides an apparatus which forms a resin layer, and the apparatus comprises the application apparatus according to the present invention, as well as a member which cures the coating of the light curable resin composition after it has been formed by the application apparatus. With such the apparatus for the formation of the resin layer, the resin layer can be obtained which has a small variation in its thickness.

Therefore, the present invention provides the application apparatus which applies the liquid material to the flat plate by means of spin coating, which apparatus comprises:

the stage which supports the flat plate and which is rotatable, the guide member which is placed generally adjacently to the flat plate in the line-contact between them which plate is placed on the stage, and the guide member having the upper surface which is positioned at generally the same level as that of the first main surface of the flat plate, and a mechanism which supplies the liquid material onto the first main surface of the flat plate, wherein the guide member is preferably the outer guide member and/or the inner guide member. It is noted that when the inner guide member is provided, the mechanism which supplies the liquid material supplies the liquid material on to the first main surface and/or the upper surface of the inner guide member.

In addition, the present invention provides an apparatus which forms the resin layer of the cured light curable resin composition on the flat plate, which apparatus comprises:

the application apparatus according to the present invention as described above, a mechanism which removes away the flat plate on which a coating of the light curable resin composition as the liquid material has been formed, and a mechanism which exposes the coating of the light curable resin composition on the flat plate so as to cure the light curable resin composition to form the resin layer.

Further, the present invention provides an apparatus which forms the resin layer of the cured light curable resin composition on the flat plate, which apparatus comprises:

the application apparatus according to the present invention as described above, a mechanism which exposes the coating of the light curable resin composition on the first main surface of the flat plate and the upper surface of the guide member as it is so as to cure the light curable resin whereby the resin layer is formed, a mechanism which takes away the flat plate from the stage, and a mechanism which removes a part of the resin layer which part extends beyond an edge of the flat plate which has been taken away from the stage.

It is noted that the method which forms the resin layer and the apparatus which forms the resin layer as described above can be used for the production of an optical disc. Therefore, the present invention provides a method which produces the optical disc wherein the method which forms the resin layer as described above is used so that a light permeable layer or a protection layer of the optical disc is formed as the resin layer. Further, the present invention provides an apparatus for the production of the optical disc which apparatus comprises the apparatus which forms the resin layer as described above which is used to form a light permeable layer or a protection layer of the optical disc as the resin layer.

BRIEF DESCRIPTION OF THE DRAWINGS

FIG. 1(b) is a cross sectional view of an embodiment in which a center part of an inner guide member is protruding, FIG. 1(c) is a cross sectional view of an embodiment in which a center part of an inner guide member has an open space, and FIG. 1(d) is a cross sectional view of a flat plate after a liquid material has been applied onto the flat plate when levels of upper surfaces of guide members are higher than a level of the flat plate.

FIGS. 4(a)–4(c) schematically show in cross sectional views an embodiment in which a coating is formed on a plurality of flat plates in series, wherein FIG. 4(a) shows a flat plate which is being removed from a stage after an application, FIG. 4(b) shows the next flat plate to be applied which is being placed on the stage (inner and outer peripheral side surfaces of the flat plate are to be in line-contact with inner and outer guide members, respectively), and FIG. 4(c) shows inner and outer guide members which are to be in line-contact with (or in line-adjacency to) inner and outer peripheral side surfaces of the flat plate, and the guide members have inclined surfaces which face the inner and outer side surfaces of the flat plate.

FIGS. 6(a)–6(b) are cross sectional views wherein FIG. 6(a) shows a coating of a light curable resin composition that is formed on a flat plate by the application method according to the present invention, and FIG. 6(b) shows a portion of thus formed coating substantially only on the flat plate which is exposed to be cured.

Figure 1:
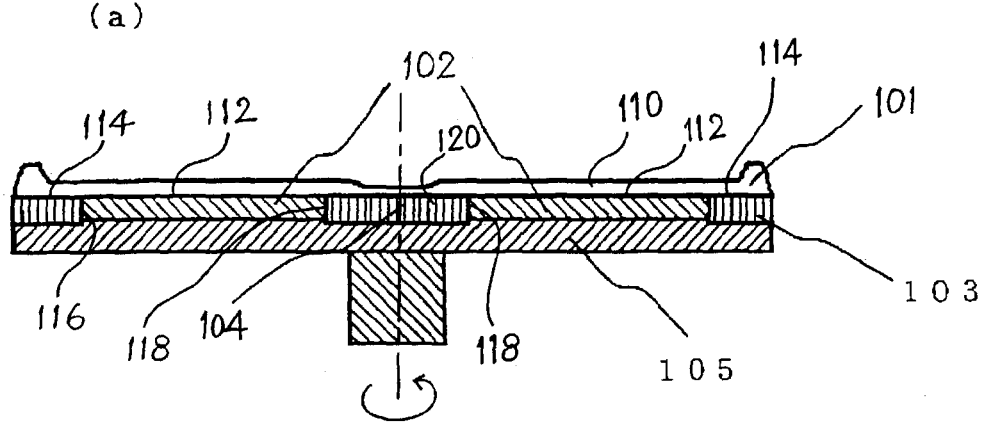
FIG. 1 (a) is a cross sectional view of a flat plate having a hole after a liquid material has been applied onto the flat plate.
Figure 1:
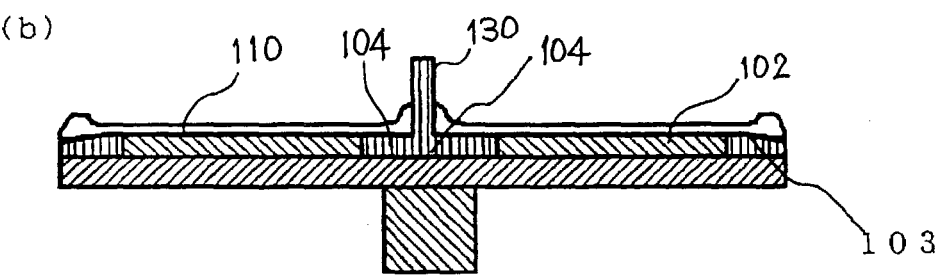
Figure 1:
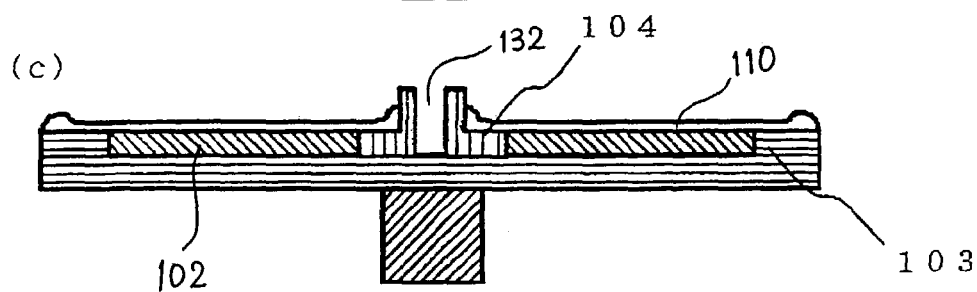
Figure 1:
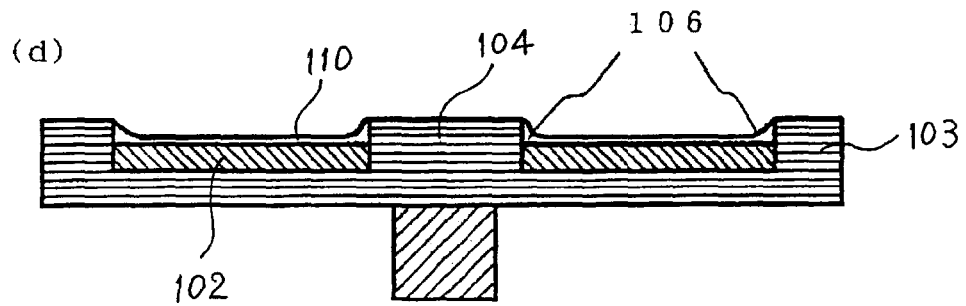

The numerals in the drawings indicate the following members:

101 . . . bulge portion, 102 . . . flat plate,
103 . . . outer guide member, 104 . . . inner guide member,
105 . . . stage, 106 . . . bulge portion,
110 . . . liquid material, 112 . . . first main surface,
114 . . . upper surface of outer guide member,
116 . . . outer peripheral side surface of flat plate,
118 . . . inner peripheral side surface of flat plate,
120 . . . upper surface of inner guide member,
130 . . . protruding part, 132 . . . center space,
201 . . . flat plate, 202 . . . guide member, 204 . . . stage,
401 . . . liquid material, 402 . . . flat plate,
403 . . . outer guide member, 404 . . . inner guide member,
405 . . . stage,
406 . . . side surface of outer guide member,
407 . . . side surface of inner guide member,
408 . . . groove, 409 . . . groove, 410 . . . discharge port,
411 . . . flat plate (without coating),
501 . . . circular plate, 502 . . . liquid material,
503 . . . outer guide member, 504 . . . liquid material,
505 . . . circular plate, 506 . . . stage,
507 . . . inner guide member, 601 . . . outer guide member,
602 . . . inner guide member, 603 . . . groove,
604 . . . groove, 605 . . . stage, 606 . . . flat plate,
607 . . . coating, 608 . . . supporting rod,
609 . . . cover, 610 . . . exposure apparatus,
611 . . . resin layer, 620 . . . application apparatus,
701 . . . outer guide member, 702 . . . inner guide member,
703 . . . groove, 704 . . . groove, 705 . . . stage,
706 . . . flat plate, 707 . . . coating, 708 . . . cover,
709 . . . exposure apparatus, 710 . . . resin layer,
720 . . . application apparatus, 802 . . . brush,
804 . . . liquid material, 806 . . . flat plate, 808 . . . nozzle,
810 . . . nozzle, 812 . . . roller, 901 . . . flat plate,
902 . . . stage, 903 . . . applied liquid material,
904 bulge portion, 908 . . . hole,
910 . . . outer peripheral part,
920 . . . inner peripheral part.

DETAILED DESCRIPTION OF THE PREFERRED EMBODIMENTS

Various embodiments of the present invention will be explained in detail with reference to the accompanying drawings. A circular plate having a circular hole in its center which is used for the production of, for example, an optical disc is specifically referred to as an example of the flat plate. However, the flat plate does not necessarily have a hole, and the shape of the flat plate is not necessarily circular and it may be, for example, a rectangular plate similar to a card. The present invention may be applicable to any application method of liquid material, any application apparatus for the liquid material, any method for the formation of the resin layer and any apparatus for the formation of the resin layer.

Embodiment 1

In the method according to the present invention, a manner of supplying the liquid material is not particularly limited. For example, the liquid material may be supplied in a dropping manner or a spraying manner onto or near a rotation center for the spin coating of the first main surface of the flat plate or over the entirety of the first main surface. Such supply may be continued during the spin coating operation or stopped before starting the spin coating operation. When the flat plate has a hole through the plate and the inner guide member is placed generally adjacent to the flat plate in the hole, the liquid material may be supplied onto the upper surface of the inner guide member.

Figure 9:
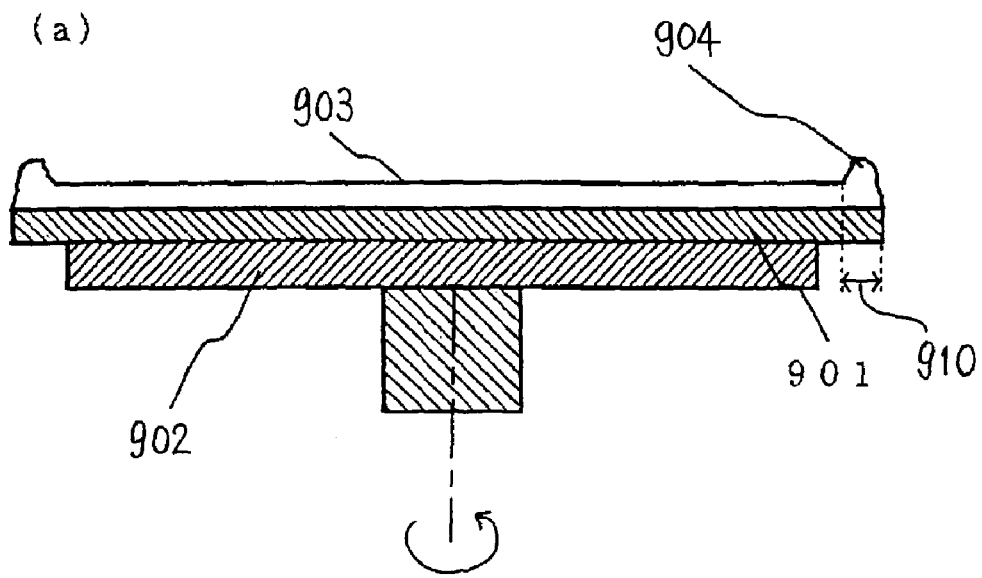
FIGS. 9(a)–9(b) show a conventional application method by spin coating.
Figure 9:
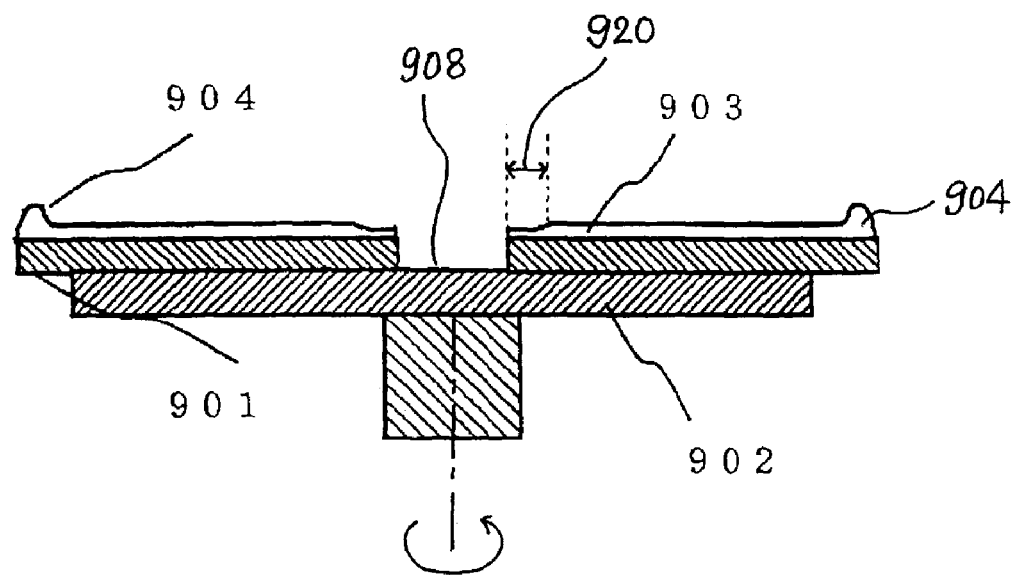

Similarly to FIG. 9, FIG. 1(a) shows a cross sectional view of a flat plate 102 just after the liquid material 110 has been applied to a first main surface of the plate, which is placed on the stage 105. In the illustrated embodiment, the outer guide member 103 is provided and it is so designed that the outer guide member 103 is generally adjacent to the outer peripheral side surface 116 of the flat plate 102 so that the first main surface 112 of the flat plate is located at substantially the same level as that of the upper surface 114 of the outer guide member 103. In other words, the first main surface 112 and the upper surface 114 of the outer guide member are at generally the same level. Also, the inner guide member 104 is provided and it is so application is substantially different only in that no liquid designed that the inner guide member 104 is generally adjacent to the inner peripheral side surface 118 of the flat plate 102 so that the first main surface 112 of the flat plate 102 is located at substantially the same level as that of the upper surface 120 of the inner guide member 104. In other words, the first main surface 112 of the flat plate 102 and the upper surface 120 of the inner guide member 104 are at generally the same level.

Although FIG. 1(a) shows the state after the application of the liquid material, the state before the material 110 is present. The liquid material 110 is supplied onto, for example, a vicinity of the center of the inner guide member 104, followed by rotating the flat plate 102 which is placed on the stage 105. In the illustrated embodiment, the outer guide member 103 is placed generally adjacently to the entire outer peripheral side surface 116 of the flat plate 102, and also the inner guide member 104 is placed in the hole so that it is generally adjacent to the inner peripheral side surface 118 of the plate 102. FIG. 1(a) shows the guide members which are substantially in contact with the flat plate, but there may be some gap between the members and the plate as previously described. In addition, the upper surfaces 114 and 120 of the guide members 103 and 104 are at generally the same level as that of the first main surface 112 of the flat plate 102 as described above. By being generally adjacent, the upper surfaces of the guide members 103 and 104, respectively, are existing substantially in the same single plane together with the first main surface.

When the spin coating is carried out with the guide member(s) as described above, a bulge portion 101, which was formed on the outer peripheral part of the flat plate 102 (such as a plate for an optical disc) by the conventional application method, is formed on the upper surface 114 of the outer guide member 103 as shown in FIG. 1(a), so that the variation in the thickness of the coating on the flat plate because of the bulge portion is avoided. Further, in the conventional application method, when the flat plate has a center hole, a sufficient amount of the liquid material cannot be supplied so as to prevent the liquid material from flowing into the center hole upon the application, which results in the thin thickness of the coating on the inner peripheral part of the flat plate. By providing the inner guide member 104 generally adjacently to the flat plate 102 in accordance with the present invention, it becomes possible to supply the liquid material onto the inner guide member 104, so that the liquid material can be sufficiently supplied even onto the innermost peripheral part of the flat plate. Further, there may be formed a portion of the coating having a thickness that is smaller around the rotation center of the flat plate, and thus on the inner peripheral part of the flat plate depending on the spin coating conditions. Even upon the occurrence of the formation of the thinner coating portion, the present invention allows such portion to be formed on the upper surface of the inner guide member 104, which results in a uniform thickness of the coating being formed on the first main surface of the flat plate 102.

The key which provides the above effects resides in the feature that the outer guide member 103, and preferably the outer guide member 103 and the inner guide member 104, are so placed that only the uniform portion of the coating (i.e., an annular portion of the coating excluding outer peripheral and inner peripheral portions of the coating) is located on the flat plate 102. In order to provide this key feature, upon the spin coating operation, the first main surface of the flat plate 102 and the upper surface of the outer guide member 103, and preferably the first main surface of the flat plate 102 and the upper surfaces of the outer and inner guide members 103 and 104, have to be located in a single plane while they are in contact with each other or separated by a gap. The liquid material (for example, a light curable resin composition) has to substantially smoothly flow across a border portion between those surfaces (strictly, between edges of the surfaces). In order to achieve this, the outer guide member and/or the inner guide member is positioned generally adjacently to the flat plate, and the upper surface 114 of the outer guide member 103 is at generally the same level as that of the first main surface 112 of the flat plate 102, and the upper surface 120 of the inner guide member 104 is at generally the same level as that of the first main surface 112 of the flat plate 102.

In order to make the liquid material flow substantially smoothly, any difference between the level of the first main surface 112 of the flat plate 102 and the upper surface 114 of the outer guide member 103 or the upper surface 120 of the inner guide member 104 is preferably not larger than 50% and more preferably not larger than 25% of a predetermined thickness of the coating to be formed by the application. The level of upper surface(s) of the guide member(s) may be higher or lower than the level of the first main surface of the flat plate. Therefore, in the present invention, when the level difference is within 50% of the desired thickness of the coating, the surfaces in question are referred to as being substantially at generally the same level.

It is noted that when the level of the upper surface 120 of the inner guide member 104 or the upper surface 114 of the outer guide member 103 is higher than that of the first surface 112 of the flat plate 120, a bulge portion 106 is formed along the border between the first main surface 112 and the upper surface 120 or 114 of the inner or outer guide member 104 or 103 (see FIG. 1 (d)). A height (or a thickness) of such bulge portion 106 is almost equivalent to the level difference between the first main surface of the flat plate 102 and the upper surface of the outer guide member 103 or the inner guide member 104. Thus, it is more preferable that such level difference is within a tolerance in the thickness variation of the coating. It is to be noted that when the level difference is greater than the tolerance, the effects provided by the present invention may be reduced. Therefore, "at generally the same level" in the present specification also includes a level difference that is greater than the tolerance as far as the uniformity of the coating formed by the application method according to the present invention is improved when compared with the conventional spin coating application method without using a guide member. Therefore, the level difference within the tolerance as described above is for a preferable embodiment.

The gap between the guide member and the side surface of the flat plate, particularly a distance between an edge of the first main surface 112 of the flat plate 102 and an edge of the upper surface of the outer or inner guide member 103 or 104 is so selected depending on a viscosity of the liquid material that the effects of the present invention are provided. In order that the liquid material smoothly flows across the border as described above, the gap is preferably small. Especially, when the flat plate is rotated together with the guide member(s), the gap may be zero in its distance. That is, these structures may be in contact with each other. In general, the higher viscosity of the liquid material leads to the larger gap in its distance without degrading the effects of the present invention. It should be noted that a gap, which is too large, will prevent the smooth flow of the liquid material and thus is not appropriate. The gap (i.e., the length between the edges) is selected to be preferably within 500%, and more preferably within 200% of the thickness of the coating to be formed. When it is preferable that the guide member(s) is not in contact with (i.e., spaced from) the side surface of the flat plate, for example, because they rotate at different speeds, a size of the flat plate (such as a diameter) varies, or the liquid material is likely to attach to a surface of the guide member which surface is opposed to the side surface of the flat plate, the gap is selected to be in a range preferably between 50% and 500%, and more preferably between 100% and 200% of the predetermined thickness of the coating to be formed.

As to the size and the shape of the flat plate, there is generally individual difference, so that the gap varies depending on the individual difference. Considering that the gap is desirably selected based on the thickness of the coating to be formed, the individual difference affects the thickness of the coating to be formed.

For example, a diameter variation of a circular substrate as the flat plate for the optical disc has been recently controlled to be in a range between 10 micrometers and 20 micrometers. When the thickness of the coating to be formed is 20 micrometers, the more preferable gap, which best provides the effects of the present invention, is in the range between 100% and 200% as described above (thus, a range between 20 micrometers and 40 micrometers), so that the more preferable gap has a width of 20 micrometers. Therefore, even when a position of the edge of the substrate is shifted maximally by 20 micrometers because of the individual difference, the gap which best provides the effects of the present invention can be maintained. When this is applied to, for example, a diameter of a substrate for an optical disc as the flat plate, an allowable individual difference of the diameter doubles (i.e., 40 micrometers), which is greater than the actual diameter variation (i.e., 10 to 20 micrometers).

As to the individual difference and the coating thickness as described above, generally the following are derived: The gap which best provides the effects of the present invention is in the range between 100% and 200 of the thickness of the coating to be formed, and such range has a width of 100% of the thickness of the coating to be formed. This width corresponds to a tolerable individual difference in the position of the outer peripheral side surface of the flat plate to be coated. When such tolerable individual difference is converted into a size (for example, a diameter) of the flat plate, 200% of the thickness of the coating to be formed is allowable in the diameter individual difference of the flat plate.

It should be noted that figures in the above explanations are only for the optimum effects of the present invention, and the effects of the present invention can be obtained even though the individual difference of the flat plate is greater than the above.

Based on the above, when the coating is formed on a flat plate having the individual difference in its size of "x", the application method according to the present invention is preferably applicable for the formation of the coating of which thickness is not smaller than "(½)x" (i.e., 0.5x). As to the recent substrate for the optical disc as described above, the present application method is conveniently applicable when the intended thickness of the coating is at least 20 micrometers. It is of course possible that when the individual difference of the substrate becomes smaller, the present invention is applicable to the formation of the coating having a smaller thickness.

In the embodiments shown in FIGS. 1(a) to (d), the outer guide member 103 or the inner guide member 104 are joined substantially integrally with the stage 105, and the outer guide member 103 is generally adjacent to the entire outer peripheral side surface of flat plate and the inner guide member 104 is generally adjacent to the entire inner peripheral side surface of the flat plate. However, the guide member(s) is not necessarily generally adjacent to the entire outer or inner side surface of the flat plate, but the guide member(s) may be generally adjacent to only a portion of the outer or inner side surface of the flat plate. It is noted that in the embodiments shown in FIGS. 1 (a) to (d), the flat plate 102 is in contact with the inner and outer guide members 104 and 103, and they rotate together as if they were unified.

In addition, the outer guide member 103 and/or the inner guide member 104 may be a separate member(s) so that it can rotate independently of the stage. In this case, the guide member(s) may rotate around the same center as that of the flat plate at an angular velocity which is different from that of the flat plate, and the effects of the present invention may be provided more or less. It is preferable that the outer guide member 103 and/or the inner guide member 104 and the stage 105 (and thus the flat plate 102) rotate at the same angular velocity around the same axis and in the same direction (that is, the guide members and the flat plates rotate integrally together), so that the liquid material will flow more smoothly across the border between the upper surface of the inner guide member 104 and the first surface and the border between the first surface and the upper surface of the outer guide member 103.

Figure 2:
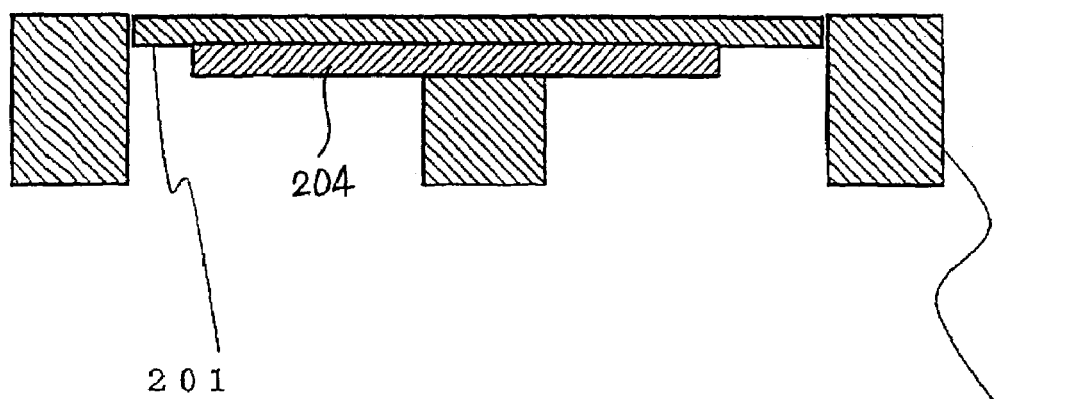
FIG. 2(a) is a cross sectional view and FIG. 2(b) is a top view of an embodiment in which an outer guide member is generally in contact with a portion of an outer peripheral side surface of a flat plate.
Figure 2:
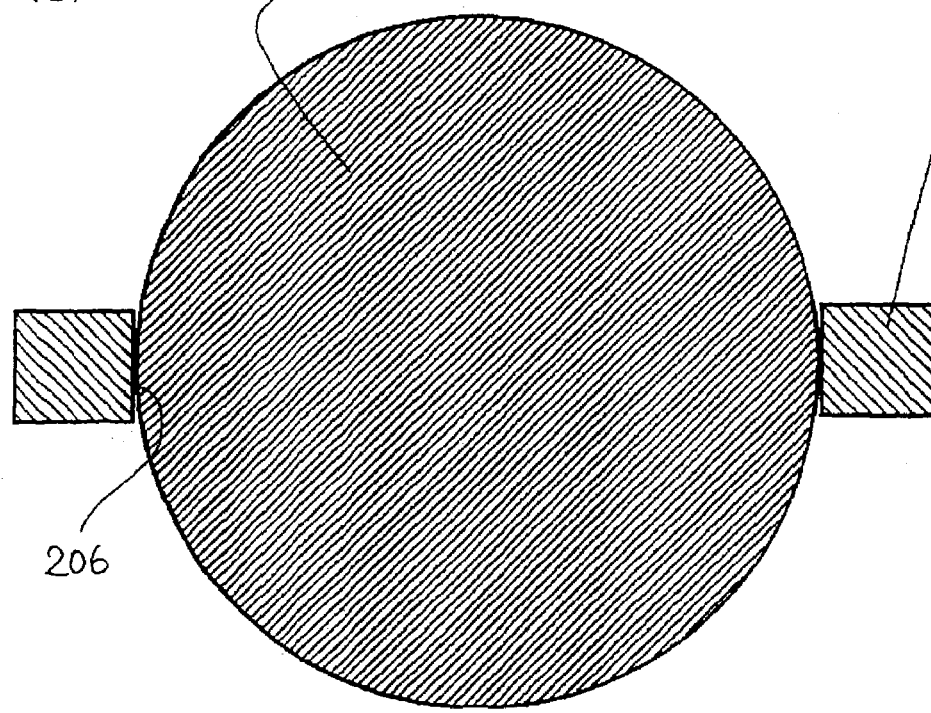

In one embodiment of the present invention, the outer guide member 202 is so designed that it is generally adjacent to only a portion of the peripheral side surface of the flat plate 201 placed on the stage 204 as shown in FIG. 2(a). Even in such embodiment, the variation in the thickness of the coating and the formation of the bulge portion of the coating on the peripheral part of the flat plate 201, which occurred with the conventional application method, are suppressed or avoided. The number of the outer guide member 202 may be two as shown in FIGS. 2(a) and (b) or another number (one or more than two) is possible.

The surface 206 of the outer guide member 202, which surface is facing a portion of the outer peripheral side surface of the flat plate 201, is shown to be flat in FIGS. 2(a) and (b), but it may be shaped so that the entire surface 206 is generally adjacent to the portion of the side surface, namely it may be of a curved form (preferably the surface 206 has a curvature which is substantially the same as that of the portion of the side surface). As shown in FIGS. 2(a) and (b), when the outer guide member 202 is opposed to a portion of the outer peripheral side surface of the flat plate 201, the rotational speeds of the outer guide member and the flat plate have to be selected so that the outer guide member 202 moves along (or rotates around) the periphery of the flat plate 201. Optionally, only the flat plate 201 may rotate and the outer guide member 202 may not rotate.

It is noted that either of the outer guide member and the inner guide member may be used alone, and if possible, both of the members may be used, so that the effects of the present invention can be provided. The forms of the outer guide member and the inner guide member are not limited to those shown in FIG. 1(a), and they may be of other forms as far as they meet the features of the present invention as described above so that the flat plate and the guide member(s) are generally adjacent to each other and the level of the first main surface of the flat plate is at generally the same as the level of the upper surface of the guide member(s) whereby these surfaces are on the same plane.

For example, the center part of the inner guide member 104 may have a protrusion 130 as shown in FIG. 1(b). Further, the outer guide member 103 may have a smaller thickness outwardly as shown in FIG. 1(b) or a stepped form in which the thickness is reduced in a stepwise manner. The provision of the protrusion 130 makes it easy to move the inner guide member.

In addition, the inner guide member does not necessarily cover the entire hole in a flat plate like a disc, and it may have a center space 132 as shown in FIG. 1(*c*). For example, the inner guide member 104 may be an annular form (or a flat doughnut-like form). Having the inner guide member of such annular form, as shown in FIG. 1(*c*), also makes it easy to move the guide member. Especially when a height of a wall part of the guide member which defines the space is large enough so that the wall part protrudes above the liquid material as shown in FIG. 1(*c*), the guide member can be moved by lifting up the protruding part using, for example, fingers without deposition of the liquid material on the fingers. It is noted that when the center of the hole is deviated from the rotation center of the flat plate, the position of the guide member may be also deviated from the rotation center.

Figure 3:
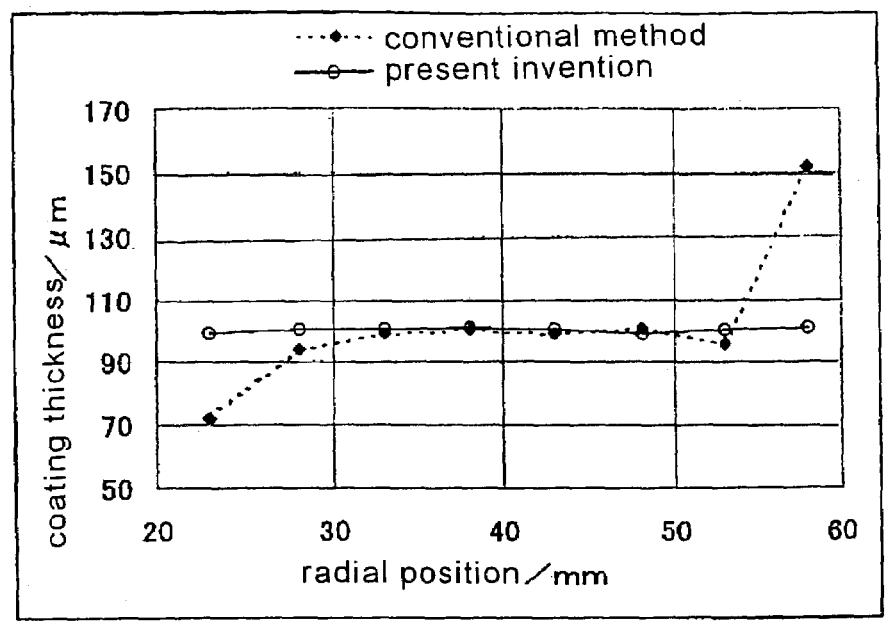
FIG. 3(a) shows relationships between a thickness and a measurement position of a coating formed by the application method of the present invention.
FIG. 3b shows relationships between a thickness of such coating and a thickness variation.
Figure 3:
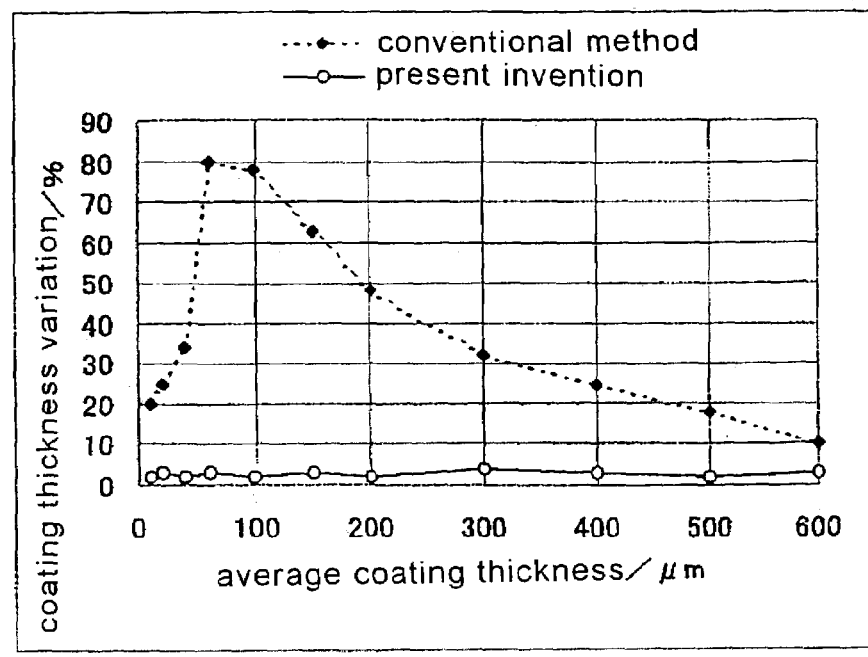

FIG. 3(*a*) shows thickness profiles of coatings after being cured. The coatings were formed using the conventional application method (i.e., the spin coating without using a guide member) as well as the application method of the present invention. The figure shows a relationship between the measurement position of the coating thickness on the flat plate radially from the center of the flat plate and a thickness of the coating at such position. As the flat plate, a disc which is used for the production of, for example, an optical disc was used, and the disc had a diameter of 60 mm and a center hole of the disc had a diameter of 15 mm. The coating after being cured of which intended thickness was 100 micrometers was formed using the spin coating method.

In the above conventional method, a liquid curable resin composition, having a viscosity of 400 mPa·s, was dropped onto the disc so as to form an annular composition ring at a radial position about 25 mm from the center of the disc, while the disc was rotated at 50 rpm, and then the disc was rotated at 350 rpm for 15 seconds. The applied coating had a thinner portion at its inner peripheral part and a thicker portion at its outer peripheral part of the disc (variation: 80%). The variation means a ratio of a thickness variance from the average thickness to the average thickness.

According to the application method of the present invention, as shown in FIG. 1(*a*), the inner guide member 104 (having an outer diameter of 15 mm) and the outer guide member 103 (having an inner diameter of 120 mm) were placed so that the guide members were in contact with the flat plate. A liquid curable resin material, having a viscosity of 400 mPa·s, was dropped onto the inner guide member 104 while the disc was rotated together with the guide members at 350 rpm for 15 seconds. The formed coating, after being cured, had a thickness variation of 2 from the inner peripheral part to the outer peripheral part of the disc. With the conventional method as described above, a large variation was caused in the outer peripheral and inner peripheral disc areas of which the width (i.e., a radial direction distance) was each about 10 mm. Based on this, it is seen that a width of 10 mm (i.e., a dimension along the radial direction of the first main surface) of each of the outer and inner guide members would be sufficient.

Using the same disc and the conventional application method and the application method of the present invention as in the case with respect to FIG. 3(*a*), a coating was formed of which the intended average thickness, after being cured, was in the range between 20 micrometers and 600 micrometers while varying the liquid materials and the application conditions. It is noted that upon calculating the average thickness, only the coating area in which the thickness variation was small was taken into account (i.e., the outer and inner peripheral areas were not taken into account). Variations of the formed coating are shown in FIG. 3(*b*). It is seen from FIG. 3(*b*) that the effects of the present invention can be obtained when the intended thickness of the coating is in the range between 20 micrometers and 500 micrometers, particularly between 40 micrometers and 300 micrometers, more particularly between 50 micrometers and 200 micrometers, and, for example, particularly between 60 micrometers and 150 micrometers.

Embodiment 2

Figure 4:
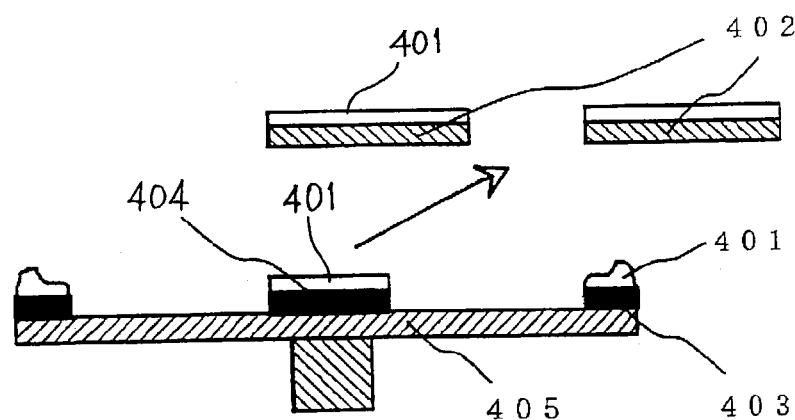
Figure 4:
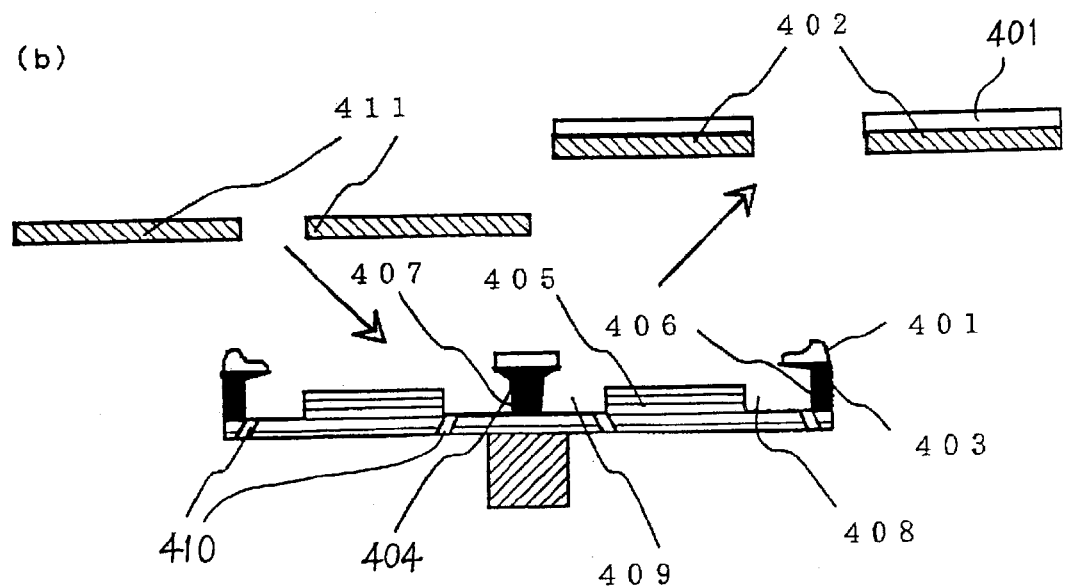
Figure 4:
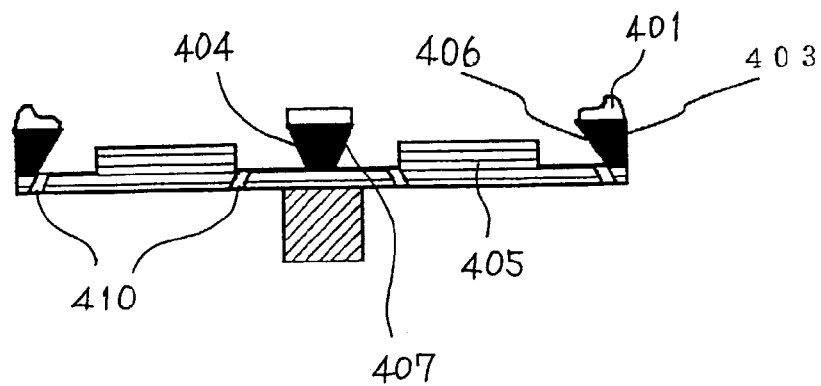

When a plurality of the flat plates are coated with the liquid material one by one in series, one flat plate 402 (such as a substrate for an optical disc) which has been coated is taken away as shown with the arrow in FIG. 4(*a*). Then a fresh flat plate 411 is placed on the stage 405 as shown with the arrow in FIG. 4(*b*). After the flat plate 402 has been taken away, there is a possibility that the liquid material (such as a liquid form light curable resin composition) 401 remaining on the outer guide member 403 or the inner guide member 404 will fall down onto the upper surface of the stage 405. When the material falls down, the liquid material 401 on the stage 405 will deposit on an unintended deposition area (a portion of the second main surface of the flat plate) rather than on an intended deposition area (the first main surface of the flat plate), so that such deposition of the liquid material on the unintended area may cause a problem as to the flat plate which is finally obtained.

Therefore, as shown in FIG. 4(*b*), the stage 405 is so designed that it has peripheral grooves 408 and 409 which are adjacent to the bases of the guide members 403 and 404. It is noted that only one peripheral groove may be adjacent to the base of the guide member. By the provision of the peripheral groove(s), even though the liquid material 401 remaining on the upper surface of the guide member falls down onto the stage 405, no liquid material is present on a part of the stage 405, that actually supports the flat plate. In other words, the stage which supports the flat plate has a recessed part which is adjacent to the guide member, and the liquid material remaining on the guide member which falls therefrom flows into the recess part so that a protruding part, which is formed due to the presence of the recessed part functions as the stage for supporting the flat plate.

As explained before, when the gap is provided between the side surface of the flat plate 411 and the surface of the guide member 403 or 404 which surface is facing the side surface, it is unlikely that the liquid material 401, which is deposited on such surface of the guide member 403 or 404, will deposit on the side surface of the flat plate 411. However, as explained in the above, upon placing the flat plate generally adjacent to the guide member, when the guide member 403 or 404 is so designed that it is generally adjacent to the side surface of the flat plate in line, the liquid material depositing on the surface 406 and/or 407 which surface is facing the outer or inner peripheral side surface of the flat plate is more unlikely to deposit on the outer or inner peripheral side surface of the flat plate 411.

It is noted that the liquid material 401, which flows into the grooves 408 and 409, may be discharged through outlet ports 410 and recovered for re-use. Any appropriate manner may be used for discharging the liquid material, and, for example, vacuum suction, gravity, a centrifugal force created by spinning the stage after the flat plate 402 has been removed and before the next flat plate 411 is placed, and so on may be used.

In the embodiment shown in FIG. 4(b), parts of the surfaces 406 and 407 of the guide members which parts are not generally adjacent to the flat plate 411, extend substantially vertically, but the surfaces 406 and 407 may be inclined as shown in FIG. 4(c). For example, when the outer guide member 403 is designed so that it has a surface 406 which is slanted such that a lower part of the surface 406 is located more outward as shown in FIG. 4(c), the liquid material depositing on the slanted surface 406 is easily discharged by applying a centrifugal force by rotating the stage 405 after the flat plate 402 has been removed and the next flat plate 411 is placed because the liquid material smoothly flows down over the surface 406 toward the groove.

It is noted that each of the features of the grooves 408 and 409 and the outer and inner guide members 403 and 404, as explained with reference to FIGS. 4(a) to (c), may be used alone so as to provide the effects of the present invention or may be used in any combination thereof so as to provide the effects of the present invention to a greater extent.

In the application method according to the present invention, it is preferable that the guide member(s) is moved away from the flat plate after the application of the liquid material by spin coating. For example, as shown in FIG. 5(a), the liquid material 502 is applied onto a disc 501 as the flat plate while using the outer and inner guide members 503 and 507, which are placed generally adjacent to the disc 501, and then as shown in FIG. 5(b), the outer guide member 503 is moved toward the outer and lower direction (lower slant direction) thereof while pivoting, and also the inner guide member 507 is moved upward (see the arrows).

Figure 5:
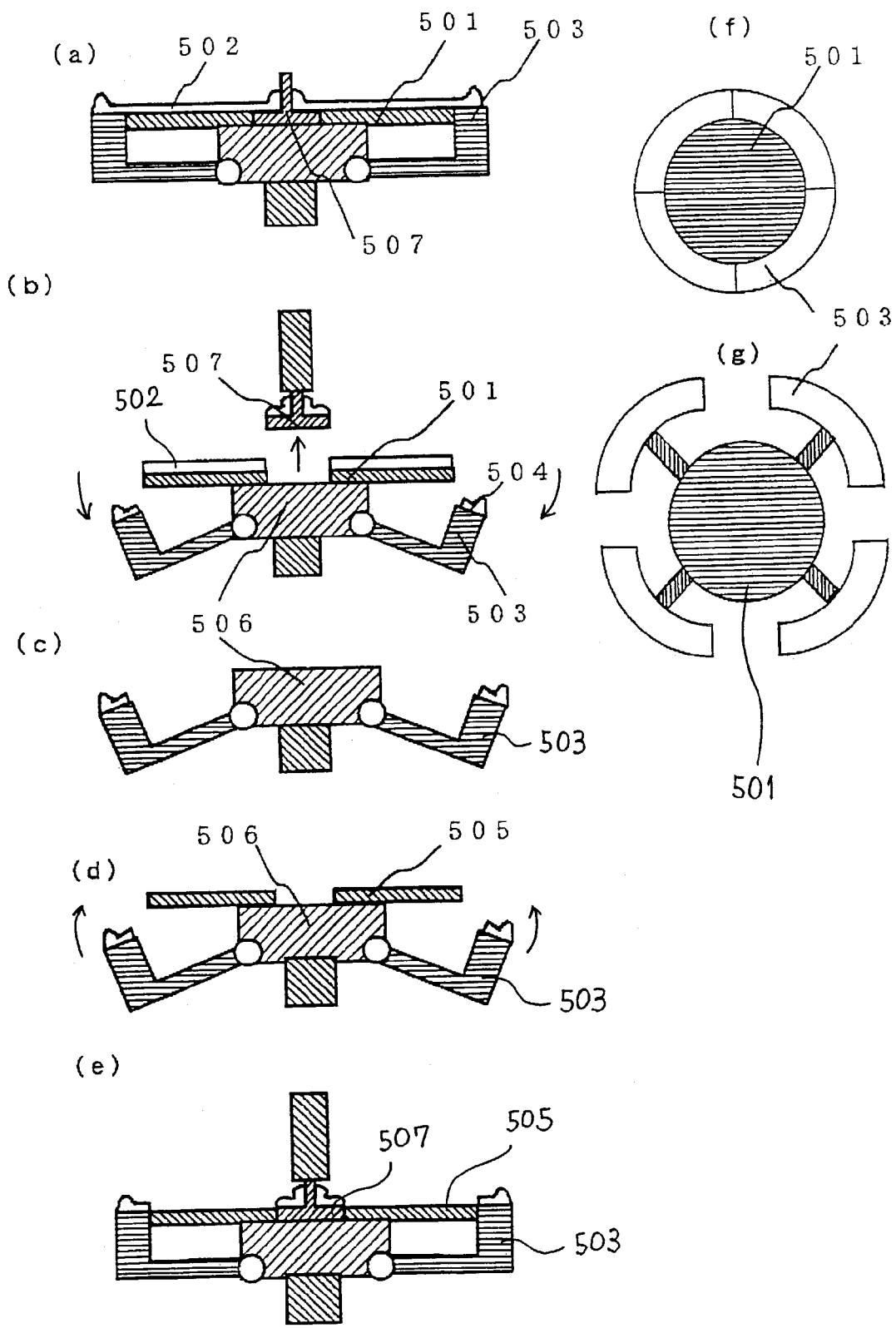
FIGS. 5(a) to 5(e) show a sequence of applying a liquid material by the spin coating according to the present invention, then removing guide members away from the flat plate, and next placing the new flat plate so as to be generally adjacent to the guide members.
FIGS. 5(f) and 5(g) show top plan views when viewing the states shown in FIGS. 5(a) and 5(b), respectively.
Figure 6:
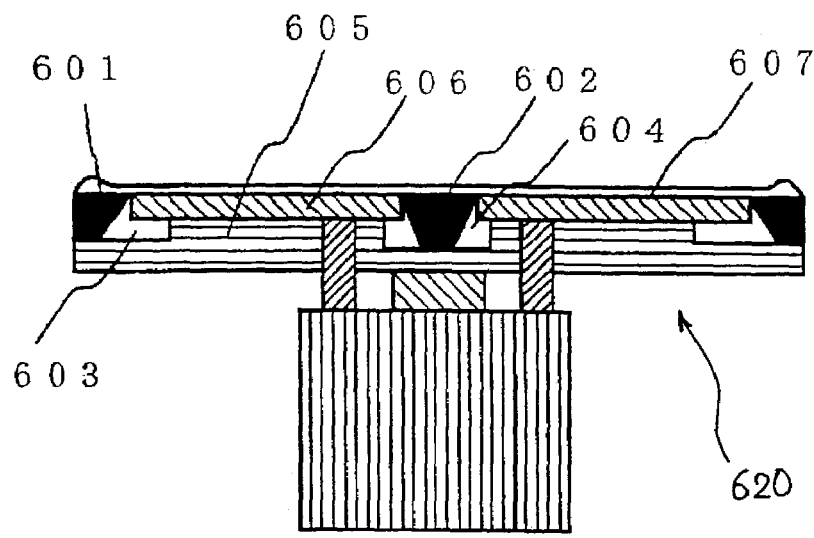
Figure 6:
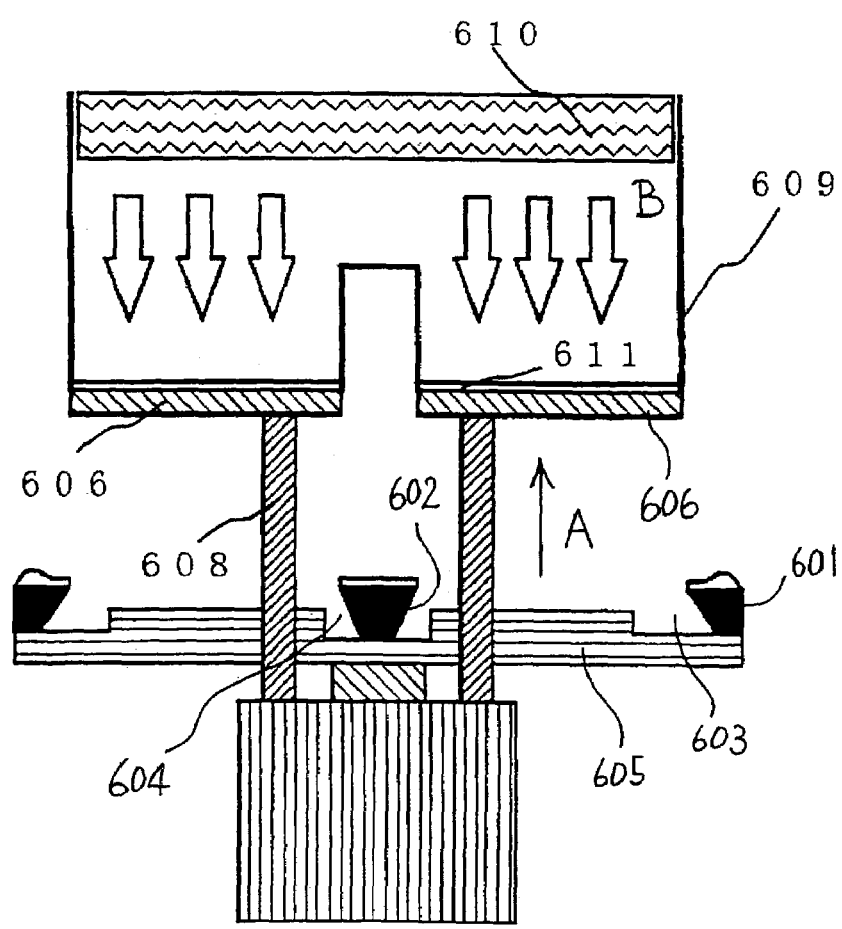
Figure 7:
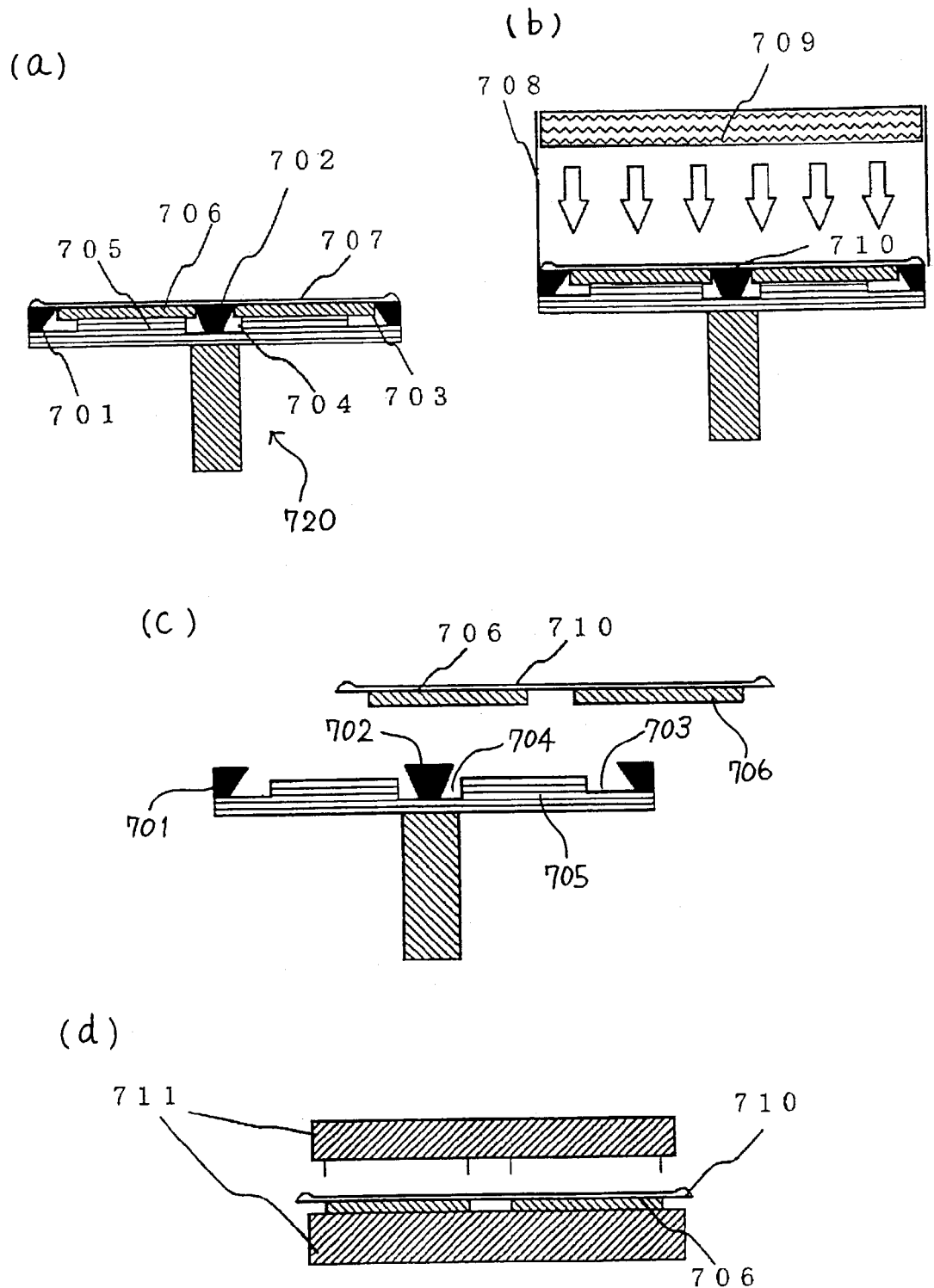
FIGS. 7(a)–7(d) schematically show cross sectional views, wherein a coating of a light curable resin composition is formed on a flat plate and guide members by the application method according to the present invention (FIG. 7(a)), thus formed coating is cured substantially entirely to form a resin layer (FIG. 7(b)), the flat plate is removed away from the stage (FIG. 7(c)), and a portion of the resin layer is finally cut away which extends beyond the edge of the flat plate (FIG. 7(d)).
Figure 8:
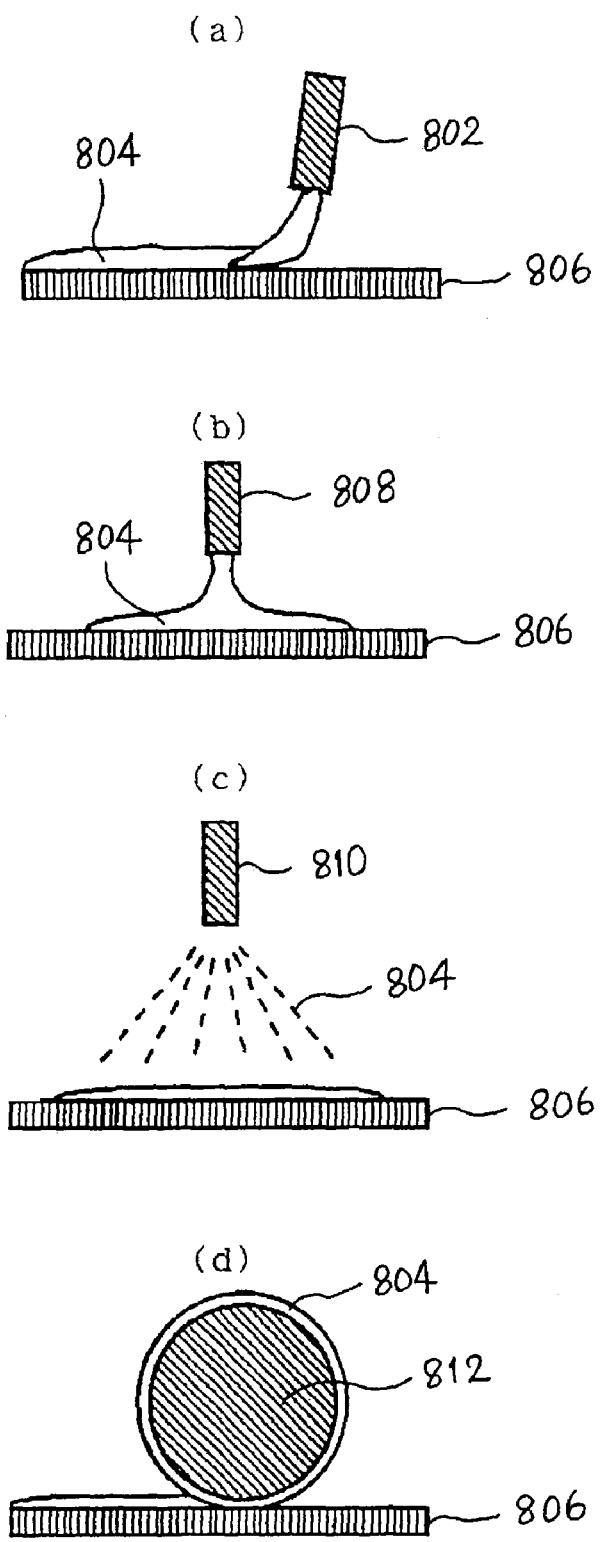
FIGS. 8(a)–8(d) show conventional application methods.

Thereafter, the disc 501 is removed from the stage 506 as shown in FIG. 5(c), then a new disc 505 is placed on the stage 506 as shown in FIG. 5(d), and next the outer guide member 503 and the inner guide member 507 are returned to their original positions as shown in FIG. 5 (e).

FIG. 5(f) and FIG. 5(g) show the movement of the outer guide member 503 as seen from above, wherein the former shows a state before the movement, and the latter shows a state after the movement. It is noted that no inner guide member is shown in FIG. 5(f) and FIG. 5(g), and the outer guide member 503 is composed of four guide pieces, which form the flat ring form outer guide member 503 which is placed around the entire periphery of the disc 501. By moving the guide members as described above, it is effectively avoided that the liquid material 504 remaining on the upper surfaces of the outer guide member 503 and/or the inner guide member 507 deposits on the lower surface (i.e., the second main surface) of the disc which surface is opposed to the first main surface and/or the side surface of the disc.

After the guide members are moved as shown in FIG. 5(b), the thickness of the coating may change after a certain period, and such change may be caused over a length along a radial direction of the disc which length is several times as long as the thickness of the coating. When such change is a problem, it is preferable that the next treatment is carried out quickly after the application of the liquid material. For example, when the liquid material is a light curable resin material, it is exposed within, for example, 30 seconds so as to cure the composition.

Also, it is possible that the liquid material may rope when the guide member is moved away. The inventors have conducted experiments using several kinds of the light curable resin compositions, and confirmed that no problem occurred during the formation of a coating having a thickness in the range between several tens of micrometers and several hundreds of micrometers. When a rather thick coating is formed while using a liquid material that is very likely to rope, then roping might cause a problem. In such case, the method which will be explained below is to be employed wherein the resin composition is cured without moving the guide member(s).

It is noted that the liquid material 504 remaining on the outer guide member 503 is swung away from the guide member upon the spin coating. However, an amount of the liquid material, which is substantially the same as that of the liquid material on the guide member will freshly remain on the guide member, so that the liquid material left on the guide member will not have to be removed. The shapes and the structures, the movement manners and the positions after the movement of the outer guide member 503 and the inner guide member 504 are not limited to those shown in FIGS. 5(a) to (g), and any other appropriate embodiments may be selected. As long as the guide member(s) are moved away quickly from the flat plate after the application, the effects of the present invention can be provided.

Embodiment 3

Next, the method for the formation of the resin layer will be explained with reference to FIGS. 6(a) to 7(d) in which method a light curable resin composition as an example of the curable resin composition which has been applied to the flat plate by using any of the application methods according to the present invention is cured particularly by exposure to light. In any of the embodiments which will be explained, the coating of the light curable resin composition is first formed on the flat plate using the application method according to the present invention.

FIGS. 6(a) and (b) show an embodiment in which only a portion of the thus formed coating 607 is cured which portion is located substantially on the flat plate 606. First, the flat plate 606 is placed on the stage 605 of the application apparatus 620 comprising the outer guide member 601, the inner guide member 602, the outer groove 603 and the inner guide 604, and the coating 607 of the liquid material is formed on the flat plate 606 by spin coating as shown FIG. 6(a).

Thereafter, the flat plate 606 is moved away by, for example, a supporting rod (or a butting member) 608 which moves the plate upward as shown with arrow A in FIG. 6(b), and the flat plate 606 is surrounded by a cover 609 so that only the flat plate 606 can be exposed as shown with arrows B. By an exposing apparatus 610, the curable resin composition as the coating is cured so as to form the resin layer 611. In this embodiment, the cover 609 tightly engages the side surface of the flat plate so that no light leaks out of the cover 609. As a result, a portion of the coating (for example, a coating portion on the guide member(s)) other than on the flat plate is not exposed, so that portions of the coating of the resin composition which are left on the outer guide member 601 and the inner guide member 602 will not be changed upon exposing of the flat plate 606. Therefore, such unchanged resin composition may be recovered and reused.

It is conceivable that the coating portion only on the flat plate can be exposed without moving the guide member(s) so as to cure the resin composition. In such a case, it is practically impossible or might be possible only with specific additional ideas that the coating portion only on the flat plate is exposed without exposing the coating portions on the guide members. Even though a mask may be placed so as to cover the guide member, a coating portion which is very closely adjacent to the flat plate will inevitably be exposed and cured even though only the coating portion on the flat plate is intended to be exposed. The resin layer, which is thus exposed and cured, remains on the upper surface of the guide member and causes a problem when the guide member is subsequently used. Therefore, the resin layer, which is attached to the upper surface has to be removed.

FIGS. 7(a) to (d) show an embodiment in which the coating 707 formed on the flat plate 706 and the outer and inner guide members 701 and 702 is entirely cured to form a resin layer 710, and then a portion of the resin layer extending beyond the edge of the flat plate is removed or cut away. First, as shown in FIG. 7(a) and also similarly to FIG. 6(a), the flat plate 706 having a center hole is placed on the stage 705 of the application apparatus 720 comprising the outer guide member 701, the inner guide member 702, the outer groove 703 and the inner guide 704, and the coating 707 of the liquid material is formed by spin coating.

Thereafter, as shown in FIG. 7(b), exposing the coating 707 is carried out using an exposure apparatus 709 having a cover 708 which encloses and exposes the entire coating 707 including even coating portions on the outer and inner guide members 701 and 702, so that the light curable resin composition will be cured, whereby the resin layer 710 is formed. Then, as shown in FIG. 7(c), the flat plate 706, together with the resin layer 710, is moved away from the stage 705, and as shown in FIG. 7(d), an unnecessary portion of the resin layer that extends beyond the edge of the flat plate 706 and a resin layer portion on the hole of the flat plate are removed by, for example, a press machine 711 having sharp blades, so that the resin layer having a desired shape is obtained, that is, a resin layer portion is left only on the flat plate 706. According to this method, the coating can be exposed in a condition as it has been formed, so that no problem occurs even though a portion other than the coating is exposed. Therefore, since the coating can be exposed in the condition as it is just after the coating is formed, the apparatus 709 may have a simpler configuration when compared with the apparatus 609 shown in FIGS. 6(a) and (b).

In the embodiment shown in FIGS. 7(a) to (d), since the resin composition on the outer and the inner guide members 701 and 702 can be removed after every application, so that deposition of the resin composition on an undesirable position of the next flat plate can be avoided. When the flat plate 706 is removed together with the resin layer 710 (as shown in FIG. 7(c)), an upwardly extending support rod, as shown in FIGS. 6(a) and (b), may be used so as to support the bottom side of the flat plate or the flat plate may be lifted up from the upper side thereof by, for example, applying a vacuum absorption since the resin composition has been already cured. Alternatively, both of such upward supporting and shifting up may be used.

Upon thus removing, some manner may be employed as to the outer and inner guide members 701 and 702 so that the resin layer 710 on the outer and inner guide members 701 and 702 is easily removed. For example, a number of fine grooves may be formed for example radially and/or peripherally on the upper surfaces of the outer and inner guide members 701 and 702, whereby a release direction can be controlled; the upper surfaces of the outer and inner guide members 701 and 702 may be treated with, for example, a fluorine composition such as a fluorine-containing polymer, whereby the upper surfaces have readily peeling off properties; or the upper surfaces of the outer and inner guide members 701 and 702 may have many small holes through which a gas can apply a gas force to push upward the resin layer when the resin layer is released from the outer and inner guide members 701 and 702.

Using the method according to the present invention as shown in FIGS. 6(a) and (b), an optical disc was prepared by applying a UV curable resin composition having a viscosity of 400 mPa·s onto a signal side of an optical disc substrate having a thickness of about 1.1 mm by spin coating at 350 rpm for 15 seconds, followed by light exposure so as to form a coating (i.e., the resin layer) as an optically permeable layer having a thickness of about 0.1 mm of which variation was not more than 2%. When the signal of the optical disc was reproduced using a reproducing apparatus of which NA was about 0.85 and laser wavelength was about 400 nm, the reproduction results were good as to the spherical aberration, the focus properties and so on. For example, a focus (residual) was smaller by about 20 than that of the optical disc of which light permeable layer was formed by a sheet substrate. This shows that the application method (and thus the formation method of the resin layer) of the present invention was particularly suited for the formation of the light permeable layer of the optical disc.

It is noted that in Embodiment 3 described above, the flat plate to be applied is one having a hole which may be used for the optical disc, but the flat plate may be without a hole, or it may be non-circular. For example, the flat plate may be of an oval, a triangle, a rectangular or a polygon, and the effects of the present invention may be obtained with such shapes of the flat plate.

As described above, the application method according to the present invention can form a coating of which thickness variation is significantly smaller compared with the conventional method. Also, the formation method of the resin layer according to the present invention can form a resin layer with less cost having a high quality in that a thickness variation of the resin layer is significantly smaller compared with the conventional method. Particularly when the guide member(s) is placed generally adjacent to the side surface of the flat plate in line, the effects of the present invention are remarkable.

Also, in the case wherein the light curable resin composition is applied to the flat plate using the application method according to the present invention to form the coating followed by exposing the coating whereby the resin layer is formed, the resin layer of which thickness variation is small can be formed on the flat plate when the flat plate having the coating is obtained while it is remote from the guide members) and then the coating is exposed, or when the coating is exposed so as to form the resin layer as it has been formed (that is, while in the condition in which the guide member(s) is generally adjacent to the side surface of the flat plate) and then an excess portion of the resin layer is removed. Such formation method of the resin layer is particularly useful for the formation of, for example, a protective layer, a light permeable layer or the like of the optical disc by using a light curable resin composition.

What is claimed is:

1. A method of forming a resin layer on a flat plate having first and second main surfaces which are opposite to each other, the method comprising:
   locating the flat plate on a raised portion of a stage which supports the flat plate whereby an upper surface of an upper portion of a guide member is at generally a same level as that of the first main surface of the flat plate, wherein the upper portion of the guide member is in contact with a side surface of the flat plate, and a side surface of the guide member adjacent to the flat plate extends downward beyond the second main surface of the flat plate, so that a gap is formed between the side surface of the guide member and a side surface of the raised portion of the stage and between the side surface of the guide member and the side surface of the flat plate;

spin coating a curable resin composition onto the first main surface of the flat plate and the upper surface of the upper portion of the guide member;

removing the flat plate from the stage and the guide member; and curing the curable resin composition on the first main surface of the flat plate to form the resin layer after the removing of the flat plate from the stage and the guide member.

2. The method of forming the resin layer according to claim 1, wherein the locating of the flat plate comprises moving the guide member such that the guide member is placed generally adjacent to the flat plate.

3. The method of forming the resin layer according to claim 1, wherein the guide member comprises an outer guide member, which is placed generally adjacent to an outer peripheral side surface of the flat plate.

4. The method of forming the resin layer according to claim 3, wherein the flat plate has a hole which passes through the flat plate forming an inner peripheral side surface, and the guide member further comprises an inner guide member, which is placed generally adjacent to the inner peripheral side surface of the flat plate.

5. The method of forming the resin layer according to claim 1, wherein the spin coating of the curable resin composition comprises rotating the guide member and the flat plate at a same angular velocity around a same rotation center.

6. The method of forming the resin layer according to claim 1, wherein an outer peripheral part of the second main surface of the flat plate is not in contact with the stage when the flat plate is located on the stage.

7. The method of forming the resin layer according to claim 4, wherein an inner peripheral part of the second main surface of the flat plate is not in contact with the stage when the flat plate is located on the stage.

8. The method of forming the resin layer according to claim 1, wherein a thickness of the coating is in the range between 20 micrometers and 500 micrometers.

9. The method of forming the resin layer according to claim 1, further comprising removing the guide member from the flat plate before the removing of the flat plate from the stage.

10. The method of forming the resin layer according to claim 1, wherein the flat plate is a substrate for an optical disc.

11. A method of producing an optical disc while using the method of forming the resin layer according to claim 1, wherein the resin layer is formed as a light permeable layer or a protection layer of the optical disc.

12. The method of forming the resin layer according to claim 1, wherein the side surface at the upper portion of the guide member facing the side surface of the flat plate and the side surface at a lower portion of the guide member facing the side surface of the flat plate are continuous and angle away from the side surface of the flat plate from the upper portion of the guide member towards the lower portion of the guide member such that the gap is formed.

13. The method of forming the resin layer according to claim 1, wherein the side surface at the upper portion of the guide member facing the side surface of the flat plate and the side surface at a lower portion of the guide member facing the side surface of the flat plate are substantially parallel to the side surface of the flat plate, and the side surface at the lower portion of the guide member is recessed away from the side surface of the flat plate such that the gap is formed.

14. The method of forming the resin layer according to claim 1, further comprising discharging a portion of the curable resin composition via the gap before the curing of the curable resin composition.

15. A method of forming a resin layer on a flat plate having first and second main surfaces which are opposite to each other, the method comprising:

locating the flat plate on a raised portion of a stage which supports the flat plate whereby an upper surface of an upper portion of a guide member is at generally a same level as that of the first main surface of the flat plate, wherein the upper portion of the guide member is in contact with a side surface of the flat plate, and a side surface of the guide member adjacent to the flat plate extends downward beyond the second main surface of the flat plate, so that a gap is formed between the side surface of the guide member a side surface of the raised portion of the stage and between the side surface of the guide member and the side surface of the flat plate;

spin coating a curable resin composition onto the first main surface of the flat plate and the upper surface of the upper portion of the guide member;

curing the curable resin composition on the first main surface of the flat plate and the upper surface of the upper portion of the guide member to form the resin layer on the flat plate; and removing the flat plate with the resin layer from the stage and the guide member after the curing of the curable resin composition.

16. The method of forming the resin layer according to claim 15, wherein the locating of the flat plate comprises moving the guide member such that the guide member is placed generally adjacent to the flat plate.

17. The method of forming the resin layer according to claim 15, wherein the guide member comprises an outer guide member, which is placed generally adjacent to an outer peripheral side surface of the flat plate.

18. The method of forming the resin layer according to claim 17, wherein the flat plate has a hole which passes through the flat plate forming an inner peripheral side surface, and the guide member further comprises an inner guide member, which is placed generally adjacent to the inner peripheral side surface of the flat plate.

19. The method of forming the resin layer according to claim 15, wherein the spin coating of the curable resin composition comprises rotating the guide member and the flat plate at a same angular velocity around a same rotation center.

20. The method of forming the resin layer according to claim 15, wherein an outer peripheral part of the second main surface of the flat plate is not in contact with the stage when the flat plate is located on the stage.

21. The method of forming the resin layer according to claim 18, wherein an inner peripheral part of the second main surface of the flat plate is not in contact with the stage when the flat plate is located on the stage.

22. The method of forming the resin layer according to claim 15, wherein a thickness of the coating is in the range between 20 micrometers and 500 micrometers.

23. The method of forming the resin layer according to claim 15, further comprising, upon curing of the curable resin composition, removing the guide member from the flat plate before the removing of the flat plate from the stage.

24. The method of forming the resin layer according to claim 15, further comprising removing a resin layer portion that extends beyond an edge of the flat plate after the removing of the flat plate from the stage.

25. The method of forming the resin layer according to claim 15, wherein the flat plate is a substrate for an optical disc.

26. A method of producing an optical disc while using the method of forming the resin layer according to claim 15, wherein the resin layer is formed as a light permeable layer or a protection layer of the optical disc.

27. The method of forming the resin layer according to claim 15, wherein the side surface at the upper portion of the guide member facing the side surface of the flat plate and the side surface at a lower portion of the guide member facing the side surface of the flat plate are continuous and angle away from the side surface of the flat plate from the upper portion of the guide member towards the lower portion of the guide member such that the gap is formed.

28. The method of forming the resin layer according to claim 15, wherein the side surface at the upper portion of the guide member facing the side surface of the flat plate and the side surface at a lower portion of the guide member facing the side surface of the flat plate are substantially parallel to the side surface of the flat plate, and the side surface at the lower portion of the guide member is recessed away from the side surface of the flat plate such that the gap is formed.

29. The method of forming the resin layer according to claim 15, further comprising discharging a portion of the curable resin composition via the gap before the curing of the curable resin composition.

30. An application method of applying a liquid material to a flat plate comprising a first main surface and a second main surface which are disposed opposite to each other, the application method comprising:
    locating the flat plate on a raised portion of a stage which supports the flat plate whereby an upper surface of an upper portion of an outer guide member is at generally a same level as that of the first main surface of the flat plate, wherein the upper portion of the outer guide member is in contact with an outer peripheral side surface of the flat plate, and a side surface of the outer guide member adjacent to the flat plate extends downward beyond the second main surface of the flat plate, so that a gap is formed between the side surface of the outer guide member and an outer side surface of the raised portion of the stage and between the side surface of the outer guide member and the outer peripheral side surface of the flat plate; and
    applying the liquid material onto the first main surface of the flat plate by spin coating to form a coating of the liquid material on the first main surface of the flat plate and the upper surface of the outer guide member.

31. The application method of the liquid material according to claim 30, wherein the spin coating of the liquid material includes rotating the outer guide member and the flat plate at a same angular velocity around a same rotation center.

32. The application method of the liquid material according to claim 30, wherein a thickness of the coating is in the range between 20 micrometers and 500 micrometers.

33. The method of forming the resin layer according to claim 30, wherein the side surface at the upper portion of the outer guide member facing the outer peripheral side surface of the flat plate and the side surface at a lower portion of the outer guide member facing the outer peripheral side surface of the flat plate are continuous and angle away from the outer peripheral side surface of the flat plate from the upper portion of the outer guide member towards the lower portion of the outer guide member such that the gap is formed.

34. The method of forming the resin layer according to claim 30, wherein the side surface at the upper portion of the outer guide member facing the outer peripheral side surface of the flat plate and the side surface at a lower portion of the outer guide member facing the outer peripheral side surface of the flat plate are substantially parallel to the outer peripheral side surface of the flat plate, and the side surface at the lower portion of the outer guide member is recessed away from the outer peripheral side surface of the flat plate such that the gap is formed.

35. An application method of applying a liquid material to a flat plate comprising a first main surface and a second main surface, which are opposite to each other, and a hole that extends through the flat plate, the application method comprising:
    locating the flat plate on a raised portion of a stage which supports the flat plate whereby an upper surface of an upper portion of an inner guide member is at generally a same level as that of the first main surface of the flat plate, wherein the upper portion of the inner guide member is in contact with an inner peripheral side surface of the flat plate, and a side surface of the inner guide member adjacent to the flat plate extends downward beyond the second main surface of the flat plate, so that a gap is formed between the side surface of the inner guide member an inner side surface of the raised portion of the stage and between the side surface of the inner guide member and the inner peripheral side surface of the flat plate; and
    applying the liquid material by spin coating onto the first main surface of the flat plate to form a coating of the liquid material on the first main surface of the flat plate and the upper surface of the inner guide member.

36. The application method of the liquid material according to claim 35, wherein the locating of the flat plate further comprises locating the flat plate on the raised portion of the stage whereby an upper surface of an upper portion of an outer guide member is at generally a same level as that of the first main surface of the flat plate, wherein the upper portion of the outer guide member is in contact with an outer peripheral side surface of the flat plate, and a side surface of the outer guide member adjacent to the flat plate extends downward beyond the second main surface of the flat plate, and a gap is formed between the side surface of the outer guide member and an outer side surface of the raised portion of the stage and between the side surface of the outer guide member and the outer peripheral side surface of the flat plate.

37. The application method of the liquid material according to claim 35, wherein the spin coating of the liquid material includes rotating the inner guide member and the flat plate at a same angular velocity around a same rotation center.

38. The application method of the liquid material according to claim 35, wherein a thickness of the coating is in the range between 20 micrometers and 500 micrometers.

39. The method of forming the resin layer according to claim 35, wherein the side surface at the upper portion of the inner guide member facing the inner peripheral side surface of the flat plate and the side surface at a lower portion of the inner guide member facing the inner peripheral side surface of the flat plate are continuous and angle away from the inner peripheral side surface of the flat plate from the upper portion of the inner guide member towards the lower portion of the inner guide member such that the gap is formed.

40. The method of forming the resin layer according to claim 35, wherein the side surface at the upper portion of the inner guide member facing the inner peripheral side surface of the flat plate and the side surface at a lower portion of the inner guide member facing the inner peripheral side surface of the flat plate are substantially parallel to the inner peripheral side surface of the flat plate, and the side surface at the lower portion of the inner guide member is recessed away from the inner peripheral side surface of the flat plate such that the gap is formed.

* * * * *

UNITED STATES PATENT AND TRADEMARK OFFICE
CERTIFICATE OF CORRECTION

PATENT NO. : 7,101,588 B2
APPLICATION NO. : 10/327129
DATED : September 5, 2006
INVENTOR(S) : Eiichi Ito et al.

It is certified that error appears in the above-identified patent and that said Letters Patent is hereby corrected as shown below:

IN THE CLAIMS
In column 22, claim 15 line 25, please replace "member a" with --member and a--.
In column 24, claim 35 line 33, please replace "member an" with --member and an--.

Signed and Sealed this

Ninth Day of January, 2007

JON W. DUDAS
*Director of the United States Patent and Trademark Office*